United States Patent
Oh et al.

(10) Patent No.: US 10,707,699 B2
(45) Date of Patent: Jul. 7, 2020

(54) INTERPHASE TRANSFORMER BASED RECTIFIER FOR WIRELESS POWER TRANSFER

(71) Applicant: Apple Inc., Cupertino, CA (US)

(72) Inventors: InHwan Oh, Cupertino, CA (US); Bharat Patel, San Jose, CA (US)

(73) Assignee: Apple Inc., Cupertino, CA (US)

( * ) Notice: Subject to any disclaimer, the term of this patent is extended or adjusted under 35 U.S.C. 154(b) by 52 days.

(21) Appl. No.: 15/847,116

(22) Filed: Dec. 19, 2017

(65) Prior Publication Data

US 2019/0097458 A1    Mar. 28, 2019

Related U.S. Application Data (60) Provisional application No. 62/564,759, filed on Sep. 28, 2017.

(51) Int. Cl.
*H02J 50/12*   (2016.01)
*H02M 7/217*   (2006.01)
*H01F 38/14*   (2006.01)
*H02J 7/02*    (2016.01)
*H02M 7/06*    (2006.01)
(Continued)

(52) U.S. Cl.
CPC .............. *H02J 50/12* (2016.02); *H01F 38/14* (2013.01); *H02J 7/025* (2013.01); *H02M 3/33523* (2013.01); *H02M 7/003* (2013.01); *H02M 7/06* (2013.01); *H02M 7/217* (2013.01); *H04B 5/0037* (2013.01); *H02M 7/066* (2013.01)

(58) Field of Classification Search
CPC ..... H02J 50/12; H01F 38/14; H02M 3/33523; H02M 7/003; H02M 7/06; H02M 7/217; H02M 7/066
USPC ........................................................ 307/104
See application file for complete search history.

(56) References Cited

U.S. PATENT DOCUMENTS

| 4,516,214 A | 5/1985 | Ray |
| 5,822,198 A | 10/1998 | Fraidlin |

(Continued)

FOREIGN PATENT DOCUMENTS

WO    2014190318 A1    11/2014

OTHER PUBLICATIONS

Chen, et al., "Analysis and design of asymmetrical half bridge flyback converter," IEE Proc.-Electr. Power Appl., vol. 149, No. 6, Nov. 2002.

(Continued)

*Primary Examiner* — Carlos Amaya
(74) *Attorney, Agent, or Firm* — Blank Rome LLP (57) ABSTRACT

A wireless power transfer circuit can include an interphase transformer operatively coupled to a receiver coil, a rectifier, and a load. The receiver coil can be configured to have an alternating current induced therein by a transmitter coil. The interphase transformer can be configured to deliver a current to the load that is twice the current induced in the receiver coil, and the rectifier can be configured to rectify the current delivered to the load. The interphase transformer may be constructed with a center tapped winding structure or a bifilar winding structure, and may be constructed as a planar transformer. The rectifier may be made up of diodes (which may be Schottky diodes) or may be a synchronous rectifier comprised of switching devices such as MOSFETs.

21 Claims, 5 Drawing Sheets

(51) Int. Cl.
  *H04B 5/00* (2006.01)
  *H02M 7/00* (2006.01)
  *H02M 3/335* (2006.01)

(56) References Cited

U.S. PATENT DOCUMENTS

| | | |
|---|---|---|
| 5,959,850 A | 9/1999 | Lim |
| 6,027,829 A | 2/2000 | Tuttle |
| 6,052,294 A | 4/2000 | Jacobs |
| 6,069,807 A | 5/2000 | Boylan |
| 6,218,891 B1 | 4/2001 | Lotfi |
| 6,248,473 B1 | 6/2001 | Lonsberry |
| 7,070,881 B2 | 7/2006 | Kishiyama |
| 7,724,555 B1 | 5/2010 | Simopoulos |
| 8,211,567 B2 | 7/2012 | Hori |
| 8,503,199 B1 | 8/2013 | Chapuis |
| 8,568,915 B2 | 10/2013 | Fuhr |
| 9,144,451 B2 | 9/2015 | Schall |
| 9,467,054 B2 | 10/2016 | Dai |
| 9,490,079 B2 | 11/2016 | So |
| 9,768,700 B2 | 9/2017 | Oh |
| 2005/0048365 A1 | 3/2005 | Miyahisa |
| 2009/0067207 A1* | 3/2009 | Nishino .................. B60L 5/005 363/126 |
| 2009/0290384 A1 | 11/2009 | Jungreis |
| 2013/0264886 A1* | 10/2013 | Nakatani ............. H04B 5/0093 307/104 |
| 2013/0329470 A1 | 12/2013 | Stroppa |
| 2014/0117878 A1 | 5/2014 | Prodic |
| 2014/0140113 A1 | 5/2014 | Oh |
| 2014/0197814 A1 | 7/2014 | Shi |
| 2014/0368167 A1 | 12/2014 | Okura |
| 2015/0194897 A1 | 7/2015 | Kim |
| 2016/0343997 A1 | 11/2016 | Sekiya |
| 2017/0040903 A1 | 2/2017 | Chen |
| 2017/0141689 A1* | 5/2017 | Hatano ............. H02M 3/33546 |
| 2018/0208072 A1* | 7/2018 | Lannoije ................ B60L 53/36 |

OTHER PUBLICATIONS

Domenico, Francesco Di, "600W LLC Demo Board," Infineon Technologies AG, 2014.
Han, et al., "Analysis and Measurement of Resonant Tank Current on LLC," Texas Instruments, SLUA690, Jul. 2013.
Lee, et al., "High-Efficiency Asymmetric Forward-Flyback Converter for Wide Output Power Range," IEEE Transactions on Power Electronics, vol. 32, No. 1, Jan. 2017.
Texas Instruments, "A 90-W, High-Efficiency, LLC Series—Resonant Converter with Secondary-Side Synchronous Rectification," SLUU467, Dec. 2010.

* cited by examiner

INTERPHASE TRANSFORMER BASED RECTIFIER FOR WIRELESS POWER TRANSFER

BACKGROUND

Interest in wireless (i.e., inductively coupled) battery charging for consumer electronic devices has been increasing. Wireless power transfer circuits (e.g., wireless battery chargers) have often been designed with a high DC voltage input, e.g., (20V to 200V or more). However, the output voltage level of these wireless power transfer circuits may be much lower, although with a relatively high output current. As a result, conduction losses on the receiver side of the wireless power transfer circuit become more and more important as output power levels increases. (Conduction losses are proportional to the square of the current.)

Conventional wireless power transfer circuits often use a full bridge rectifier on the receiver side of the circuit. At low power levels, a full bridge rectifier constructed using conventional diodes may be adequate. As power levels increase, other solutions may be appropriate, such as full bridge rectifiers constructed from Schottky diodes or a full bridge synchronous rectifier constructed using metal-oxide field effect transistors (MOSFETs). Both of these arrangements can reduce the voltage drop across the rectifier components, leading to an associated reduction in conduction losses. In some cases, the synchronous rectifier control circuitry and the MOSFETs may be available as a single integrated package.

However, as output power levels increase even further, discrete external MOSFETs may required because of thermal issues associated with integrating high power switches with the associated controller circuitry. Additionally, high voltage driver circuitry may be required because the gate driving voltage of the MOSFETs must be higher than the output voltage level. This high voltage driver circuitry can include charge pumps, boot strapping, or other means of deriving the increased voltage necessary to drive the high side switching devices. Additionally, controlling the short dead time required between high side and low side turn on (to prevent cross conduction) can be more difficult with external devices (as opposed to devices integrated in the controller silicon itself.) As a result, the receiver circuitry of higher power wireless power transfer systems becomes more complex and more costly.

Thus, a more efficient, simplified wireless power transfer receiver circuit would be a desirable addition to the art.

SUMMARY

A wireless power transfer circuit can include an interphase transformer operatively coupled to a receiver coil, a rectifier, and a load. The receiver coil can be configured to have an alternating current induced therein by a transmitter coil. The interphase transformer can be configured to deliver a current to the load that is twice the current induced in the receiver coil, and the rectifier can be configured to rectify the current delivered to the load. The interphase transformer may be constructed with a center tapped winding structure or a bifilar winding structure, and may be constructed as a planar transformer. The rectifier may be made up of diodes (which may be Schottky diodes) or may be a synchronous rectifier comprised of switching devices such as MOSFETs.

A wireless power transfer system comprising may include a wireless power transfer circuit similar to that described above. More particularly, the wireless transfer system can include a transmitter circuit and a receiver circuit. The transmitter circuit can include an inverter adapted to receive a DC input voltage and generate an AC output voltage for application to a transmitter coil. The receiver can include a receiver coil configured to have an alternating current induced therein by the transmitter coil, a rectifier coupled to the receiver coil and configured to rectify a current delivered to a load, and an interphase transformer coupled to the rectifier, the receiver coil, and the load. This configuration can allow the interphase transformer to deliver to the load a current that is twice the alternating current induced in the receiver coil. The interphase transformer and the rectifier of the wireless power transfer system can be constructed as described above. The transmitter circuit can further include a boost converter configured to regulate a DC input voltage supplied to the inverter and adjust a power factor of the wireless power transfer system.

A wireless power transfer circuit can be constructed from a receiver coil, an interphase transformer, and a rectifier interconnected as follows. The receiver coil can have a first terminal and a second terminal, and can be configured to have an alternating current induced therein by a transmitter coil. The interphase transformer can have a first terminal coupled to a first terminal of the receiver coil, a second terminal coupled to a first terminal of the load, and a third terminal coupled to the second terminal of the receiver coil, a second terminal, and a third terminal. The rectifier can include first and second switching devices. The first switching device can have a first terminal coupled to a second terminal of the load and a second terminal coupled to the second terminal of the receiver coil. The second switching device can have a first terminal coupled to the second terminal of the load and a second terminal coupled to the first terminal of the receiver coil. The first and second switching devices can be diodes, in which case the first terminals of the switching devices can be anodes and the second terminals of the switching devices can be cathodes. Alternatively, the first and second switching devices can be MOSFETs, in which case the first terminals of the switching devices can be source terminals and the second terminals of the switching devices can be drain terminals.

The foregoing wireless power transfer receiver circuits can further include a series capacitor coupled between the receiver coil and the interphase transformer. If the interphase transformer is constructed using a bifilar winding structure, the series capacitor coupled between the receiver coil and the interphase transformer can include first and second capacitors. The first capacitor can have a first terminal coupled to the first terminal of the receiver coil and a second terminal coupled to the first terminal of the interphase transformer. The second capacitor can have a first terminal coupled to a second terminal of the receiver coil and a second terminal coupled to the third terminal of the interphase transformer.

DETAILED DESCRIPTION

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, but not necessarily to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Figure 1:
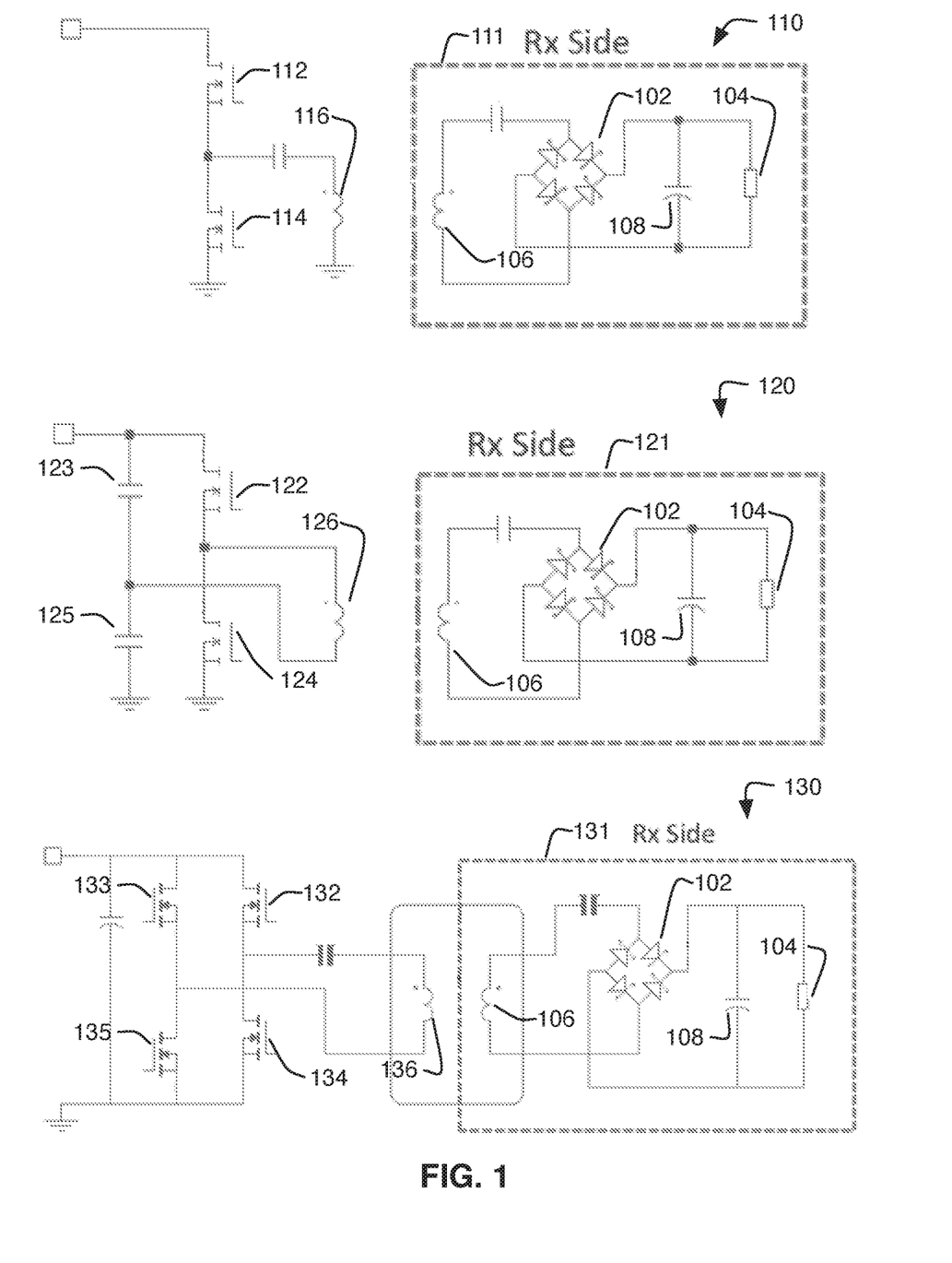
FIG. 1 illustrates a series of wireless power transfer circuits featuring different inverter designs.

FIG. 1 illustrates a series of wireless power transfer circuits 110, 120, and 130 as may be used for such applications as charging batteries in consumer electronic devices. Each of the illustrated circuits includes substantially identical receiver side circuitry 111, 121, and 131, which will be discussed in greater detail below. Each of the wireless power transfer circuits 110, 120, and 130 includes an inverter that receives a DC input voltage and generates an AC output voltage that is delivered to a transmitter coil. The DC input voltage may be received from a DC power source (such as a battery) or a rectified AC power source (such as a mains circuit) including through one or more intervening AC-DC or DC-DC converters, as illustrated below with respect to FIGS. 2 and 2A.

With continued reference to FIG. 1, wireless power transfer circuit 110 features a half bridge inverter made up of high side switching device 112 and low side switching device 114. The half bridge inverter receives a DC input voltage and generates an AC voltage that is applied to transmitter coil 116, which is magnetically coupled to a receiver coil, as described in greater detail below. Wireless power transfer circuit 120 features a semi-full bridge inverter made up of high side switching device 122, high side capacitor 123, low side switching device 124, and low side capacitor 125. As above, the semi-half bridge inverter receives a DC input voltage and generates an AC voltage that is applied to transmitter coil 126, which is magnetically coupled to a receiver coil, as described in greater detail below. Wireless power transfer circuit 130 features a full bridge inverter made up of high side switching devices 132 and 133 and low side switching devices 134 and 135. As above, the full bridge inverter receives a DC input voltage and generates an AC voltage that is applied to transmitter coil 136, which is magnetically coupled to a receiver coil.

Figure 2A:
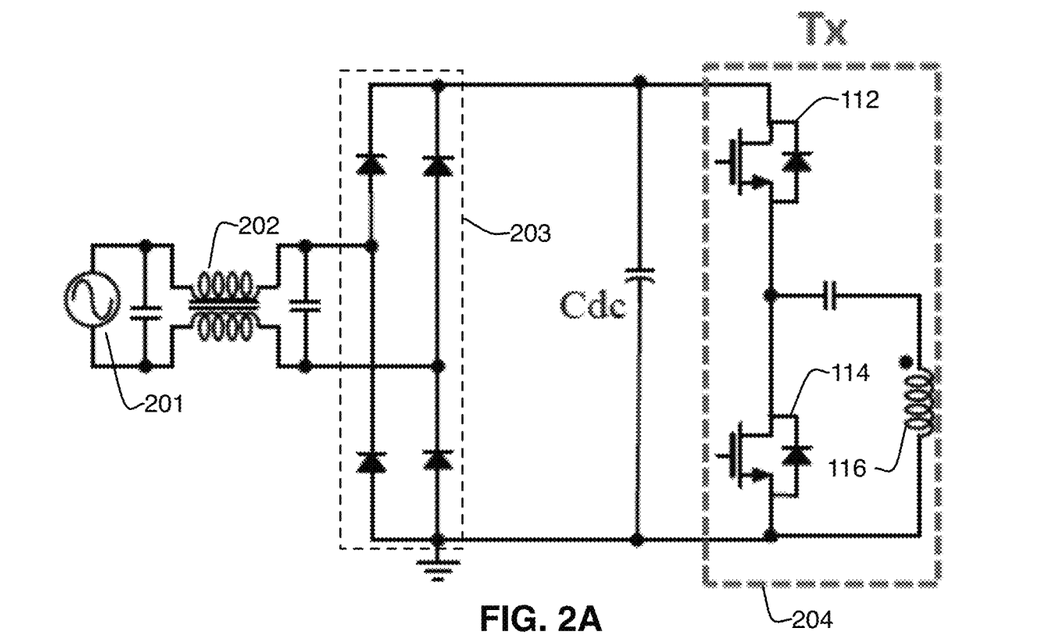
FIG. 2A illustrates a transmitter side wireless power transfer circuit in which the inverter receives the rectified AC input voltage.
Figure 2B:
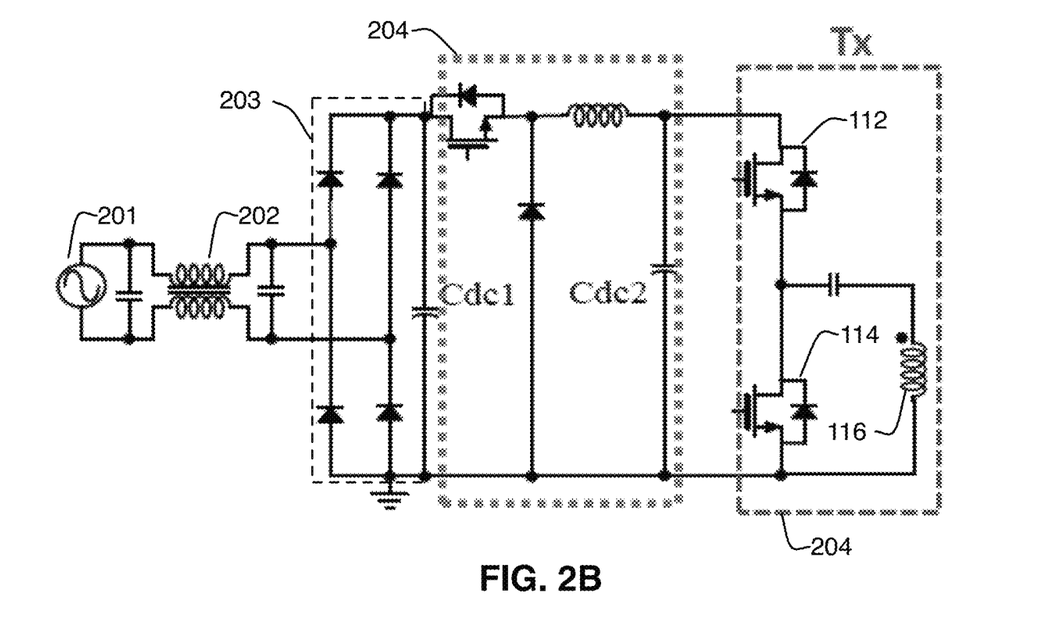
FIG. 2B illustrates a transmitter side wireless power transfer circuit in which the inverter receives the rectified AC input voltage through a non-isolated buck converter.

FIG. 2A illustrates a wireless power transmitter circuit in which a half bridge inverter 204 (like that described above with respect to wireless power transfer circuit 110; FIG. 1) receives power from AC power source 201 via (optional) EMI filter 202 and full bridge rectifier 203. FIG. 2B illustrates a wireless power transmitter circuit in which half bridge inverter 204 receives power from AC power source 201 via (optional) EMI filter 202, full bridge rectifier 203, and non-isolated boost converter 204. This non-isolated boost converter 204 may be used to regulate the DC input voltage supplied to half bridge inverter 204 as well as providing input power factor correction for the wireless power transfer circuit as seen from AC input 201. In the configurations illustrated in FIGS. 2A and 2B, the inverter may provide both a line isolation and step down function, while reducing circuit complexity, current count, and cost. These configurations may also be used with the semi-full bridge and full bridge inverter designs discussed above with respect to FIG. 1, as well as other inverter designs.

In the wireless power transmitter circuits of FIGS. 2A and 2B, it may be seen that there is no galvanic isolation between the various circuit components and the AC input source 201. However, in the construction of a wireless power transmitter, all of these components may be encapsulated such that there is no possibility of user contact with any of the components, thus obviating the need for galvanic isolation.

In some embodiments it may be advantageous to implement a primary resonant flyback converter as part of the input stage that delivers DC voltage to the inverters. Suitable primary resonant flyback converters include those disclosed in Applicant's co-pending U.S. provisional patent applications 62/538,135; 62/538,146; and 62/538,156 (and the corresponding non-provisional applications filed of even date herewith). All of the foregoing are hereby incorporated by reference in their entirety.

Operation and control of the various inverters may be performed using any of a variety of known techniques. Additionally, any of the foregoing inverter designs (or other inverter designs) may be used in connection with wireless power transfer circuits incorporating any of the various receiver side circuits discussed below.

Each of wireless power transfer circuits 110, 120, and 130 includes substantially identical receiver side circuitry 111, 121, and 131. Each receiver circuit includes a receiver coil 106, which is magnetically coupled to its respective transmitter coil 116, 126, or 136. As a result, the alternating current delivered to the transmitter coils 116, 126, or 136 by the respective inverters generates a corresponding alternating current in receiver coil 106. This alternating current passes through full bridge rectifier 102, to load 104. The output voltage may be smoothed (filtered) by output capacitor 108. In the receiver circuits 111, 121, and 131 illustrated in FIG. 1, full bridge rectifier 102 is constructed using Schottky diodes. However, as discussed above and illustrated in FIGS. 3C-3D (discussed below), the full bridge rectifiers may alternatively be constructed using synchronous rectifiers constructed from MOSFETs 302c and 302d or (not shown) using other suitable switching devices, such as silicon controlled rectifiers (SCRs) a/k/a thyristors, insulated gate bipolar transistors (IGBTs), etc.

FIGS. 3A-3D illustrate a series of wireless power transfer receiver side circuits incorporating interphase transformers and simplified rectifier arrangements.

Figure 3A:
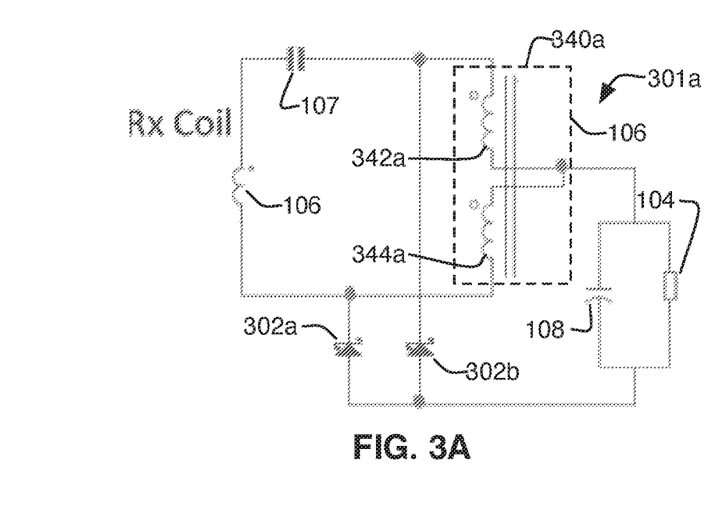
FIG. 3A illustrates a receiver side wireless power transfer circuit having an interphase transformer and two rectifiers constructed from Schottky diodes.
Figure 3B:
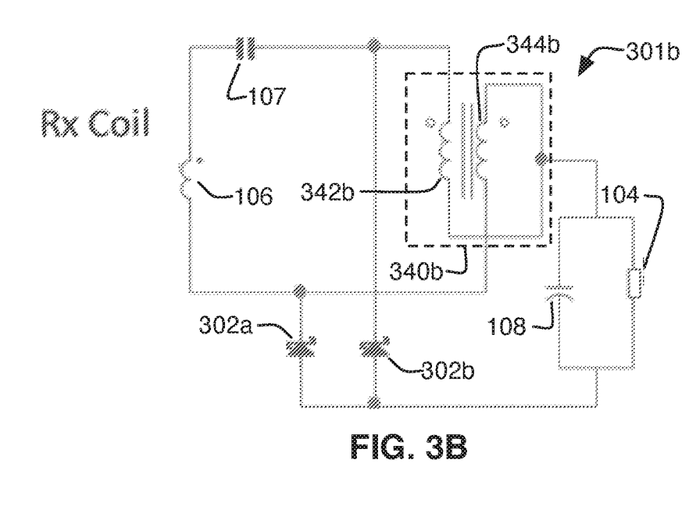
FIG. 3B illustrates an alternative receiver side wireless power transfer circuit having an interphase transformer and two rectifiers constructed from Schottky diodes.

FIG. 3A illustrates an arrangement in which interphase transformer 340a is connected in a two primary winding configuration, and in which the rectifier is constructed using two Schottky diodes. The illustrated two primary winding configuration may also be understood as a center tapped winding structure, in which a single center tapped winding has three terminals (first end, second end, and center tap) connected as illustrated and discussed in greater detail below. FIG. 3B illustrates an arrangement in which interphase transformer 340b is connected in an arrangement having a primary winding and a secondary winding, and in which the rectifier is again constructed using two Schottky diodes. The illustrated primary winding/secondary winding configuration, which may also be considered a bifilar winding structure, may be constructed using a more conventional transformer design, in which two separate windings are formed in the transformer, and those windings are interconnected as shown. From an idealized circuit analysis perspective, the two primary winding/center tap winding configuration and the primary and secondary winding/bifilar winding structure are identical. However, due to the particulars of how the interphase transformer is constructed, there may be differences in magnetic coupling, leakage inductance, parasitic resistance and/or capacitance, etc.

Figure 3C:
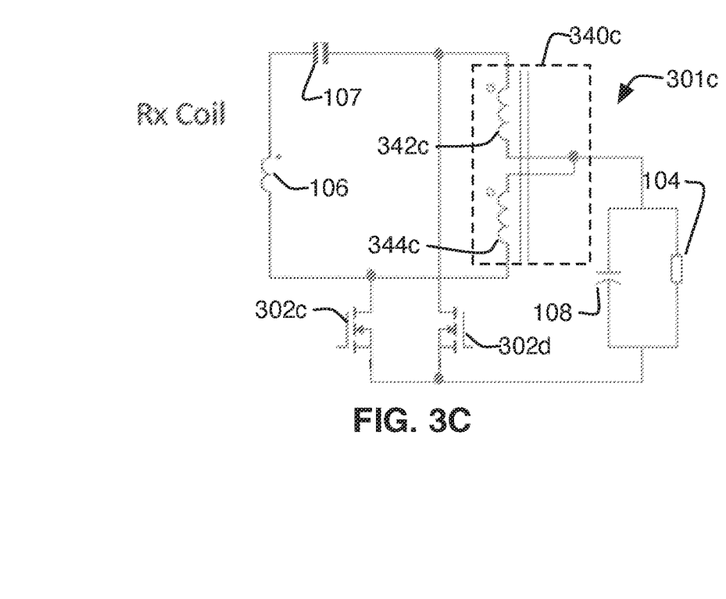
FIG. 3C illustrates a receiver side wireless power transfer circuit having an interphase transformer and two synchronous rectifiers constructed from MOSFETs.
Figure 3D:
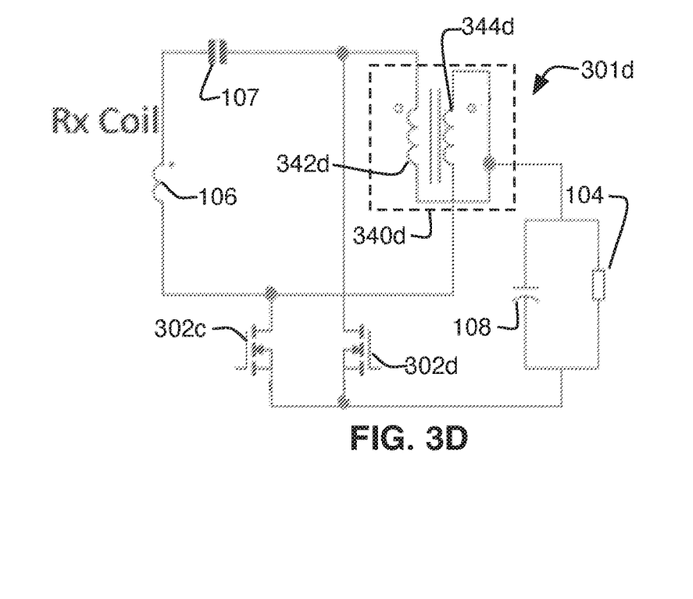
FIG. 3D illustrates an alternative receiver side wireless power transfer circuit having an interphase transformer and two synchronous rectifiers constructed from MOSFETs.

FIG. 3C illustrates an arrangement in which interphase transformer 340c is connected a two primary winding/center tap configuration, and in which the rectifier is constructed using two MOSFET synchronous rectifiers. FIG. 3D illustrates an arrangement in which interphase transformer 340d is connected in a primary/secondary winding or bifilar winding configuration, and in which the rectifier is constructed using two MOSFET synchronous rectifiers.

Operation of all four circuits is substantially the same, but for the effects caused by differences in interphase transformer construction and/or rectifier construction. With reference to FIG. 3A, receiver circuit 301a includes receiver coil 106. Receiver coil 106 may be operatively coupled to interphase transformer 340a such that a first terminal of receiver coil 106 is coupled to a first terminal of first winding 342a of interphase transformer 340a, and a second terminal of receiver coil 106 is coupled to a second terminal of second winding 344a of interphase transformer 340a. (Resonant capacitor 107 may be provided to enhance the operation of receiver circuit 301a according to a variety of known principles, and is thus not discussed in detail herein.

In the primary/secondary winding or bifilar winding configurations, the resonant capacitor may be split into two, with one in the upper rail as illustrated and one of the pair in the lower rail.) A second terminal of first winding 342a of interphase transformer 340a is coupled to a first terminal of second winding 344a of interphase transformer 340a. This common terminal is then coupled to first terminals of output capacitor 108 and load 104. Second terminals of output capacitor 108 and load 104 are coupled to the anodes of rectifier diodes 302a and 302b. Cathode of rectifier diode 302a is coupled to the second terminal of receiver coil 106, and cathode of rectifier diode 302b is coupled to the first terminal of receiver coil 106 (via resonant capacitor 107 as illustrated).

Figure 4A:
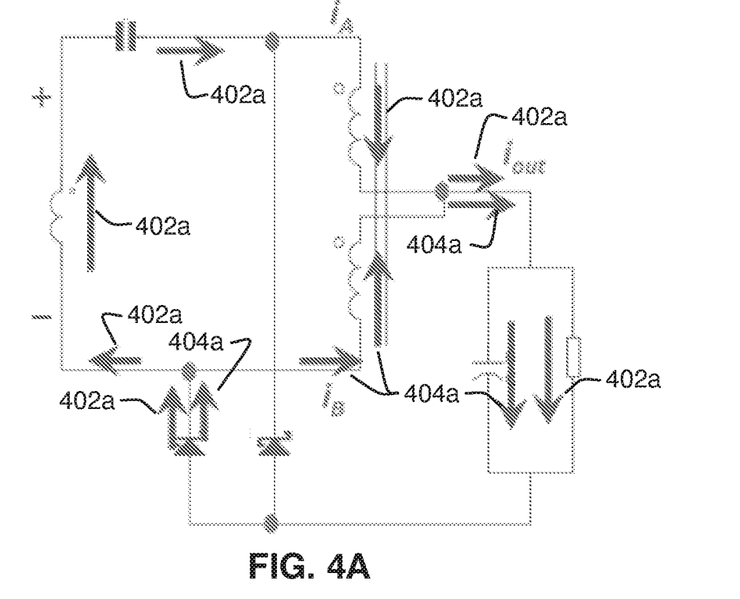
FIG. 4A illustrates the currents flowing through a receiver side wireless power transfer circuit during a positive half cycle of the current induced in the receiver coil.

FIG. 4A illustrates the currents 402a and 402b flowing through receiver circuits 301a, 301b, 301c, and 301d during a positive half cycle of the AC current induced in receiver coil 106 by the transmitter coil (not shown). As noted above, from an idealized circuit analysis perspective, the four different receiver side circuits are essentially the same. During the positive half cycle, input current 402a is induced in receiver coil 106. Input current 402a flows through resonant capacitor 107 to the first terminal of first winding 342a of interphase transformer 340a (or first windings 342b, 342c, or 342d of interphase transformers 340b, 340c, or 340d, respectively). Input current 402a causes an equal induced current 404a to flow out of the first terminal of second winding 344a (344b, 344c, or 344d) of interphase transformer 340a (340b, 340c, 340d). Input current 402a and induced current 404a sum together to form the output current that flows through load 104 and/or output capacitor 108. This combined output current flows through rectifier diode 302a after which it again splits into input current 402a, which returns to receiver coil 106, and induced current 404a which returns to the second terminal of first winding 344a (344b, 344c, 344d) of interphase transformer 340a (340b, 340c, 340d).

Figure 4B:
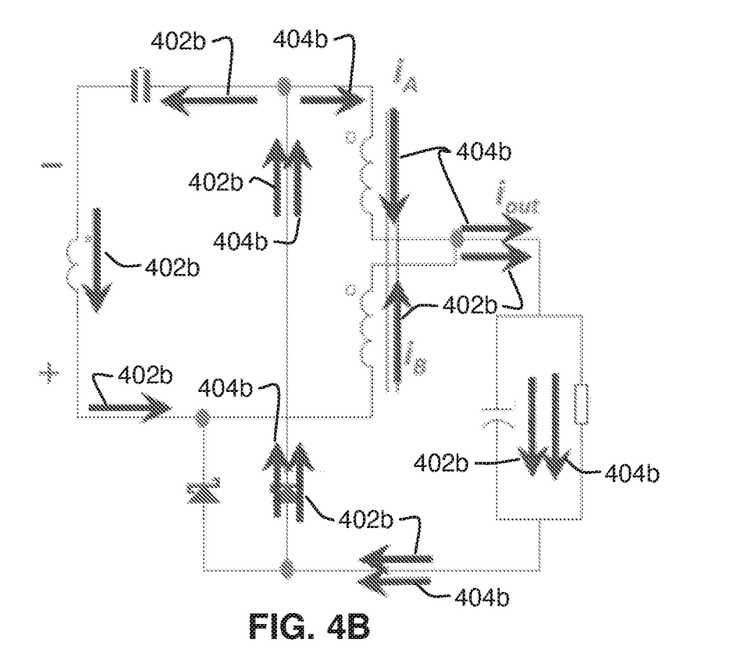
FIG. 4B illustrates the currents flowing through a receiver side wireless power transfer circuit during a negative half cycle of the current induced in the receiver coil.

FIG. 4B illustrates the currents 402b and 404b flowing through receiver circuits 301a 301b, 301c, and 301d during a negative half cycle of the AC current induced in receiver coil 106 by the transmitter coil (not shown). During the negative half cycle, input current 402b is induced in receiver coil 106. Input current 402b flows into the second terminal of second winding 344a (344b, 344c, 344d) of interphase transformer 340a (340b, 340c, 340d). Input current 402b causes an equal induced current 404b to flow out of the second terminal of first winding 342a (342b, 342c, 342d) of interphase transformer 340a (340b, 340c, 340d). Input current 402b and induced current 404b sum together to form the output current that flows through load 104 and/or output capacitor 108. This combined output current flows through rectifier diode 302b after which it again splits into input current 402b, which returns to receiver coil 106 via resonant capacitor 107 and induced current 404b, which returns to the first terminal of first winding 344a (344b, 344c, 344d) of interphase transformer 340a (340b, 340c, 340d).

The use of interphase transformer 340a, 340b, 340c, or 340d in the above described circuits can provide a number of advantageous effects. One such advantageous effect is the reduction of current in receiver coil 106. As can be seen in FIGS. 4A and 4B, the load current is the sum of the currents 402a and 402b, which come respectively from first winding 342a, 342b, 342c, 342d and second winding 344a, 344b, 344c, and 344d of the interphase transformer. However, only half of this current (i.e., current 402a) flows through receiver coil 106. This reduction of current in receiver coil 106 can substantially reduce the conduction losses associated with receiver coil 106 by a factor of four (because conduction losses are proportional to the square of the current flowing in the coil, which is reduced by half). This reduction in receiver coil current can also allow for the use of smaller receiver coil construction because smaller wire may be used to carry the rescued current. Additionally, resonant capacitor 107 also sees only half the load current, meaning that its current rating (and therefore physical size) may be reduced as well.

Additional advantageous effects can result from reducing the current through receiver coil 106. As noted above, smaller wire can be used to accommodate the reduced current requirement, which can reduce the size of receiver coil 106. However, this reduced wire size can also improve the coupling between the transmitter coil and receiver coil 106, allowing for more efficient overall operation of the wireless power transfer circuit. Additionally, the reduced current through receiver coil 106 leads to a higher voltage across receiver coil 106. Halving the current requires doubling the voltage to deliver the same amount of power. The higher voltage seen by receiver coil 106 can allow for more turns in receiver side coil 106 which can further improve magnetic coupling to the primary transformer and improving overall efficiency of the wireless power transfer circuit.

Another advantageous effect of incorporating interphase transformer 340a, 340b, 340c, or 340d in the receiver side circuit is a reduction in the number of rectifier components through which the load current must pass. As can be seen with reference to FIG. 1, which illustrates receiver side circuits incorporating full bridge rectifiers 102, during both the positive and negative half cycles of the receiver coil current, the full load current must pass through two rectifier components. This results in two voltage drops (one associated with each rectifier component) and the losses that result therefrom. However, as can be seen with respect to FIGS. 4A-4B, on each half cycle, the load current passes through only a single rectifier component, resulting in only a single voltage drop, which reduces the losses associated with rectification by 50%.

Still another advantage of the interphase transformer wireless power transfer circuit configurations described above may be a reduction in cost and/or complexity of the rectifier circuitry. As noted above, conventional circuits incorporating diode based full bridge rectifiers 102 are subject to increased power loss caused by the forward voltage drop of the diode. These losses may be mitigated through the use of Schottky diodes as shown in FIGS. 3A-3B, although this may result in increased cost. These losses may be further reduced through use of synchronous rectifier circuits, e.g., MOSFET-based synchronous rectifiers as shown in FIGS. 3C-3D. However, these circuits come with further increased costs and additional complexity associated with controlling the MOSFETs (or other switching devices). One notable cost and complexity can be the need for two high side gate drive circuits in addition to low side gate drive circuits. However, in the embodiments described above, a synchronous rectifier may be implemented only two low side MOSFETs, which can eliminate the need for high side gate drive circuits. The synchronous rectifier controller may also be simplified because both switches have grounded drains and a common voltage reference. In other embodiments (e.g., those with relatively lower power requirements), a diode or Schottky diode based rectifier may be used in place of a synchronous rectifier, resulting in still further reductions in cost and complexity.

Figure 5:
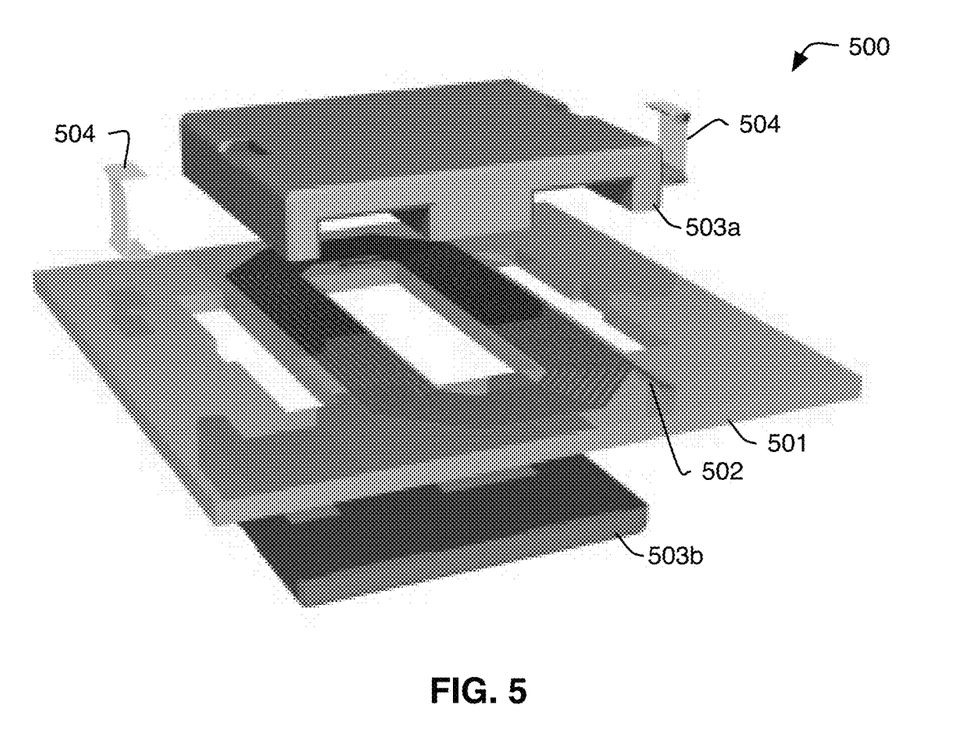
FIG. 5 illustrates construction of an interphase transformer as a planar transformer.

Interphase transformer 340 may be constructed in a variety of ways. For space constraints or other reasons, it may be desirable to implement interphase transformer 340 as a planar transformer 500, as illustrated in FIG. 5. Planar transformer 500 can include a printed circuit board (PCB) 501, which has windings 502 formed thereon. In some cases, a first winding 502 may be formed on a first side of printed circuit board 501, with a second winding (not shown) formed on the opposite side. In other cases, multi-layer PCBs may be formed in which the winding(s) are formed on the various layers. The windings may be formed in a variety of configurations, including the center tapped winding structure and bifilar winding structures described above with respect to FIGS. 3A and 3B.

PCB 501 may also include a plurality of holes or slots formed therein, which can allow for the "ears" of E-shaped core half 503a to pass through and make contact with I-shaped core half 503b. The core halves may be constructed from a high magnetic permeability material, such as ferrite. The core halves may be secured together by clips 504 or other suitable retaining mechanism. Many variations of this construction type are possible, including, for example, one in which an interphase transformer 340 shares a ferrite core with receiver coil 106.

CONCLUSION

Described above are various features and embodiments relating to wireless power transfer receiver circuits incorporating interphase transformers. Such circuits may be used in a variety of applications, but may be particular advantageous when used in conjunction with power adapters and/or battery chargers for portable electronic devices such as mobile telephones, smart phones, tablet computers, laptop computers, media players, and the like as well as the peripherals associated therewith. Such associated peripherals can include input devices (such as keyboards, mice, touchpads, tablets, and the like), output devices (such as headphones or speakers), storage devices, or any other peripheral.

Additionally, although numerous specific features and various embodiments have been described, it is to be understood that, unless otherwise noted as being mutually exclusive, the various features and embodiments may be combined in any of the various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:
1. A wireless power transfer circuit comprising:
   an interphase transformer operatively coupled to a receiver coil,
   a rectifier, and
   a load,
   wherein:
      the receiver coil is configured to have an alternating current induced therein by a transmitter coil,
      the interphase transformer is configured so that respective winding currents of the interphase transformer sum together, whereby a current delivered to the load is twice the current induced in the receiver coil, and
      the rectifier is configured to rectify the current delivered to the load.

2. The wireless power transfer circuit of claim 1 wherein the interphase transformer has a center tapped winding structure.

3. The wireless power transfer circuit of claim 1 wherein the interphase transformer has a bifilar winding structure.

4. The wireless power transfer circuit of claim 1 wherein the interphase transformer is constructed as a planar transformer.

5. The wireless power transfer circuit of claim 4 wherein the interphase transformer includes a center tapped winding structure.

6. The wireless power transfer circuit of claim 4 wherein the interphase transformer has a bifilar winding structure.

7. The wireless power transfer circuit of claim 1 wherein the rectifier comprises two diodes.

8. The wireless power transfer circuit of claim 7 wherein the two diodes are Schottky diodes.

9. The wireless power transfer circuit of claim 1 wherein the rectifier is a synchronous rectifier comprising two MOSFETs.

10. The wireless power transfer circuit of claim 1 further comprising a series resonant capacitor operationally coupled to the receiver coil.

11. A wireless power transfer system comprising:
a transmitter circuit comprising an inverter adapted to receive a DC input voltage and generate an AC output voltage for application to a transmitter coil; and
a receiver circuit comprising:
a receiver coil configured to have an alternating current induced therein by the transmitter coil;
a rectifier coupled to the receiver coil and configured to rectify a current delivered to a load; and
an interphase transformer coupled to the rectifier, the receiver coil, and the load, wherein the interphase transformer is configured so that respective winding currents of the interphase transformer sum together to deliver to the load a current that is twice the alternating current induced in the receiver coil.

12. The wireless power transfer system of claim 11 wherein the rectifier comprises two switching devices, a first switching device having a first terminal coupled to a first terminal of the receiver coil and a second witching device having a first terminal coupled to as second terminal of the receiver coil, each switching device having a second terminal coupled to a second terminal of the other switching device.

13. The wireless power transfer system of claim 12 wherein the switching devices are diodes.

14. The wireless power transfer system of claim 13 wherein the diodes are Schottky diodes.

15. The wireless power transfer system of claim 12 wherein the switching devices are MOSFETs.

16. The wireless power transfer system of claim 11 wherein the transmitter circuit further comprises a boost converter configured to regulate a DC input voltage supplied to the inverter and adjust a power factor of the wireless power transfer system.

17. A wireless power transfer receiver circuit comprising:
a receiver coil having a first terminal and a second terminal, the receiver coil being configured to have an alternating current induced therein by a transmitter coil;
an interphase transformer having a first terminal coupled to a first terminal of the receiver coil, a second terminal coupled to a first terminal of a load, and a third terminal coupled to the second terminal of the receiver coil; and
a rectifier comprising first and second switching devices, the first switching device having a first terminal coupled to a second terminal of the load and a second terminal coupled to the second terminal of the receiver coil, and the second switching device having a first terminal coupled to the second terminal of the load and a second terminal coupled to the first terminal of the receiver coil.

18. The wireless power transfer receiver circuit of claim 17 wherein the first and second switching devices are diodes, and the first terminals of the switching devices are anodes and the second terminals of the switching devices are cathodes.

19. The wireless power transfer receiver circuit of claim 17 wherein the first and second switching devices are MOSFETs, and the first terminals of the switching devices are source terminals and the second terminals of the switching devices are drain terminals.

20. The wireless power transfer receiver circuit of claim 17 further comprising a series capacitor coupled between the receiver coil and the interphase transformer.

21. The wireless power transfer receiver circuit of claim 20 wherein the interphase transformer has a bifilar winding structure and the series capacitor coupled between the receiver coil and the interphase transformer comprises a first capacitor having a first terminal coupled to the first terminal of the receiver coil and a second terminal coupled to the first terminal of the interphase transformer, and a second capacitor having a first terminal coupled to a second terminal of the receiver coil and a second terminal coupled to the third terminal of the interphase transformer.

* * * * *